United States Patent
Lee et al.

(10) Patent No.: US 11,229,080 B2
(45) Date of Patent: Jan. 18, 2022

(54) METHOD, APPARATUS AND SYSTEM FOR MANAGING SESSION IN WIRELESS COMMUNICATION SYSTEM

(71) Applicant: SAMSUNG ELECTRONICS CO., LTD., Suwon-si (KR)

(72) Inventors: Giwon Lee, Suwon-si (KR); Moonyoung Jeong, Suwon-si (KR); Youngsung Kho, Suwon-si (KR); Joonseo Lee, Suwon-si (KR); Kyuho Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 149 days.

(21) Appl. No.: 16/259,443

(22) Filed: Jan. 28, 2019

(65) Prior Publication Data
US 2019/0239270 A1    Aug. 1, 2019

(30) Foreign Application Priority Data

Jan. 26, 2018 (KR) .................. 10-2018-0010118

(51) Int. Cl.
| | |
|---|---|
| *H04W 76/18* | (2018.01) |
| *H04W 36/00* | (2009.01) |
| *H04W 88/18* | (2009.01) |
| *H04W 76/15* | (2018.01) |
| *H04W 40/24* | (2009.01) |
| *H04L 12/66* | (2006.01) |
| *H04W 24/04* | (2009.01) |

(52) U.S. Cl.
CPC ............. *H04W 76/18* (2018.02); *H04L 12/66* (2013.01); *H04W 36/0011* (2013.01); *H04W 40/24* (2013.01); *H04W 76/15* (2018.02); *H04W 88/18* (2013.01); *H04W 24/04* (2013.01)

(58) Field of Classification Search
CPC ..... H04W 76/18; H04W 88/18; H04W 76/15; H04W 40/24; H04W 36/0011; H04W 76/19; H04W 76/22; H04L 12/66; H04L 45/28
See application file for complete search history.

(56) References Cited

U.S. PATENT DOCUMENTS

| | | | |
|---|---|---|---|
| 2004/0095881 A1* | 5/2004 | Borella | ............... H04L 12/5602 370/219 |
| 2016/0344628 A1 | 11/2016 | Hocker et al. | |
| 2018/0309560 A1* | 10/2018 | Tang | ..................... H04L 5/0094 |

* cited by examiner

*Primary Examiner* — Anez C Ebrahim
(74) *Attorney, Agent, or Firm* — Sughrue Mion, PLLC

(57) ABSTRACT

Provided are a method and apparatus for managing a session in a wireless communication system. The method includes identifying a session management module with a failure from among a plurality of session management modules that each manage at least one session; determining a substitute module that replaces the session management module with the failure; obtaining, from a control plane entity, information about at least one session managed by the session management module with the failure; and controlling the substitute module to manage the at least one session, based on the obtained information about the at least one session.

18 Claims, 13 Drawing Sheets

METHOD, APPARATUS AND SYSTEM FOR MANAGING SESSION IN WIRELESS COMMUNICATION SYSTEM

CROSS-REFERENCE TO RELATED APPLICATION(S)

This application is based on and claims priority under 35 U.S.C. § 119 to Korean Patent Application No. 10-2018-0010118, filed on Jan. 26, 2018, in the Korean Intellectual Property Office, the disclosure of which is incorporated by reference herein in its entirety.

BACKGROUND

1. Field

The disclosure relates to methods, apparatuses, and systems for managing a session, and more particularly, to a method of managing a session in a core network of a wireless communication system.

2. Description of Related Art

In order to meet the increasing demand with respect to wireless data traffic because the commercialization of 4G communication systems, efforts are made to develop improved communication systems. In order to achieve a high data transfer rate, consideration is given to implementing the improved communication systems in millimeter wave (mmW) frequency bands (e.g., 60 GHz bands). In order to reduce propagation path loss and increase a propagation distance in the millimeter wave frequency bands, in the improved communication systems, discussions are underway about technologies such as beam-forming, massive multiple input multiple output (MIMO), full dimensional MIMO (FD-MIMO), array antenna, analog beam-forming, and large scale antenna. Also, in order to improve networks of communication systems, in 5G communication systems, developments of technologies such as evolved small cell, advanced small cell, cloud radio access network (cloud RAN), ultra-dense network, device to device communication (D2D), wireless backhaul, moving network, cooperative communication, coordinated multi-points (CoMP), and interference cancellation are underway. Furthermore, in the 5G communication systems, developments of an advanced coding modulation (ACM) scheme such as hybrid FSK and QAM modulation (FQAM) and sliding window superposition coding (SWSC) and an enhanced network access scheme such as filter bank multi carrier (FBMC), non-orthogonal multiple access (NOMA), and sparse code multiple access (SCMA) are underway.

Furthermore, in 4G communication systems and 5G communication systems that are recently developed (e.g., beyond 4G systems and pre-5G systems), efforts are continuously being made to distribute increasingly huge amounts of data by separating user plane data and control plane data from each other by using network function virtualization (NFV) and software defined networking (SDN). That is, new technologies are introduced to improve communication efficiency in both radio access networks and core networks constituting communication systems.

Because wireless communication systems may provide more varied services due to the introduction of the above technologies, methods of smoothly providing the services are required.

The above information is presented as background information only to assist with an understanding of the present disclosure. No determination has been made, and no assertion is made, as to whether any of the above might be applicable as prior art with regard to present disclosure.

SUMMARY

Provided are methods that efficiently manage a session and are robust against failure.

Additional aspects will be set forth in part in the description which follows and, in part, will be apparent from the description, or may be learned by practice of the presented embodiments.

According to an aspect of the disclosure, a method of managing a session in a wireless communication system includes: identifying a session management module with a failure from among a plurality of session management modules that each manage at least one session; determining a substitute module that replaces the session management module with the failure; obtaining, from a control plane entity, information about at least one session managed by the session management module with the failure; and controlling the substitute module to manage the at least one session based on the obtained information about the at least one session.

The obtaining may include transmitting, to the control plane entity, a request for the information about the at least one session managed by the session management module with the failure and receiving the information about the at least one session from the control plane entity based on the request.

The request for the information about the at least one session may include at least one of information about address information of the substitute module and a session identifier of the at least one session managed by the session management module with the failure.

The request for the information about the at least one session may be included in a N4 association setup request message or an Sx association setup request message.

The obtaining may include receiving, from the control plane entity, the information about the at least one session managed by the session management module with the failure, according to each session.

The obtaining may include obtaining the information about the at least one session managed by the session management module with the failure through a packet data unit (PDU) session establishment request message or a create session request message.

The information about the at least one session may include at least one of quality of service (QoS) information, billing information, user equipment (UE) address information, or terminal equipment (TE) address information.

According to another aspect of the disclosure, a method of managing a session in a wireless communication system includes: receiving, from a user plane entity, a request for information about at least one session managed by a module with a failure; searching for the information about the at least one session based on the request; and transmitting the information about the at least one session to the user plane entity.

The transmitting may include providing the information about the at least one session to a substitute module of the user plane entity that replaces the module with the failure.

The transmitting may include transmitting the information about the at least one session managed by the module with the failure by using a packet data unit (PDU) session establishment request message according to each session.

According to another aspect of the disclosure, an apparatus for managing a session in a wireless communication system includes: a transceiver configured to obtain, from a control plane entity, information about at least one session managed by a session management module with a failure; and a processor configured to identify the session management module with the failure from among a plurality of session management modules that each manage at least one session, determine a substitute module that replaces the session management module with the failure, and control the substitute module to manage the at least one session based on the obtained information about the at least one session.

The transceiver may be further configured to transmit, to the control plane entity, a request for the information about the at least one session managed by the session management module with the failure and receive, from the control plane entity, the information about the at least one session based on the request.

The request for the information about the at least one session may include at least one of information about address information of the substitute module and a session identifier of the at least one session managed by the session management module with the failure.

The request for the information about the at least one session may be included in a N4 association setup request message or an Sx association setup request message.

The transceiver may be further configured to receive, from the control plane entity, the information about the at least one session managed by the session management module with the failure, according to each session.

The transceiver may be further configured to obtain the information about the at least one session managed by the session management module with the failure through a packet data unit (PDU) session establishment request message or a create session request message.

The information about the at least one session may include at least one of quality of service (QoS) information, billing information, user equipment (UE) address information, or terminal equipment (TE) address information.

According to an aspect of the disclosure, an apparatus for managing a session in a wireless communication system includes: a processor configured to search for information about at least one session managed by a module with a failure; and a transceiver configured to receive, from a user plane entity, a request for the information about the at least one session managed by the module with the failure and transmit, to the user plane entity, the information about the at least one session.

The transceiver may be further configured to provide the information about the at least one session to a substitute module of the user plane entity that replaces the module with the failure.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
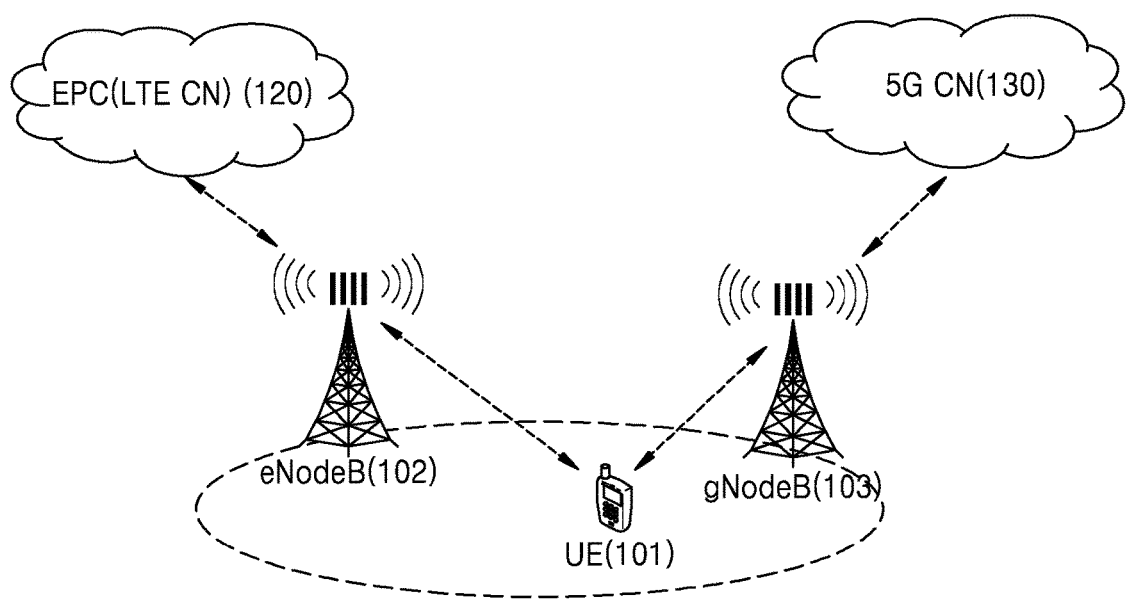
FIG. 1 is a view illustrating a block diagram of a communication system, according to an embodiment.

Hereinafter, embodiments of the disclosure will be described with reference to the accompanying drawings.

In the following description of embodiments of the disclosure, descriptions of techniques that are well known in the art and not directly related to the disclosure are omitted. This is to clearly convey the gist of the disclosure by omitting an unnecessary explanation.

For the same reason, some elements in the drawings are exaggerated, omitted, or schematically illustrated. Also, the size of each element does not entirely reflect the actual size. In the drawings, the same or corresponding elements are denoted by the same reference numerals.

The advantages and features of the disclosure and the manner of achieving them will become apparent with reference to embodiments of the disclosure described in detail below with reference to the accompanying drawings. The disclosure may, however, be embodied in many different forms and should not be construed as limited to embodiments of the disclosure set forth herein. Rather, these embodiments of the disclosure are provided so that this disclosure will be thorough and complete, and will fully convey the scope of the disclosure to one of ordinary skill in the art, and the disclosure is only defined by the scope of claims. Like reference numerals refer to like elements throughout.

It will be understood that each block of flowchart illustrations and combinations of blocks in the flowchart illustrations may be implemented by computer program instructions. These computer program instructions may be provided to a processor of a general purpose computer, special purpose computer, or other programmable data processing apparatus, such that the instructions, which are executed via the processor of the computer or other programmable data processing apparatus, generate means for implementing the functions specified in the flowchart block or blocks. These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

In addition, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term 'unit' used herein may refer to a software or hardware component or device, such as a field programmable gate array (FPGA) or an application specific integrated circuit (ASIC), which performs certain tasks. The unit may be configured to reside on an addressable storage medium and configured to execute on one or more processors. Thus, the unit may include, by way of example, components, such as software components, object-oriented software components, class components, and task components, processes, functions, attributes, procedures, sub-routines, segments of program code, drivers, firmware, microcode, circuitry, data, databases, data structures, tables, arrays, and variables. The functionality provided for in the components and units may be combined into fewer components and units or further separated into additional components and units. In addition, the components and units may be implemented to operate one or more central processing units (CPUs) in a device or a secure multimedia card. Also, in the embodiments of the disclosure, the unit may include one or more processors.

In the following description, terms for identifying a connection node, terms for indicating network entities, terms for indicating messages, terms for indicating an interface between network objects, terms for indicating various kinds of identification information, etc. are exemplary only for convenience of explanation. Therefore, the disclosure is not limited by the following terms, and other terms having equivalent technical meanings may be used.

For convenience of explanation, the disclosure uses terms and names defined in the 3rd generation partnership project long term evolution (3GPP LTE) standard or modifications based on the defined terms and names. However, the disclosure is not limited by such terms and names, and may be equally applied to systems that conform to other standards.

The term 'user terminal' used herein may refer to user equipment (UE). Examples of the UE may include a personal computer, a cell phone, a smartphone, a TV, a tablet, a notebook, a personal digital assistant (PDA), a portable multimedia player (PMP), a navigation device, an MP3 player, a digital camera, a black box, a device mounted on a vehicle, a module in a device mounted on a vehicle, and a vehicle itself. However, the disclosure is not limited thereto, and the examples of the UE may include various other devices.

The term 'session' used herein may refer to the flow of data generated by the combination of wireless communication devices that may exchange data together. In other words, the session may refer to a logical connection for communication between devices in a network environment, and would be obvious to one of ordinary skill in the art and thus a detailed explanation thereof will not be given here.

The term 'entity' used herein may refer to an entity in a system or a program. The entity may be referred to as a component, an element, an object, or a subject, and when classified by function, may be referred to as a function. For example, an entity in a communication system may refer to an element that performs a predetermined function in a network, such as a gateway, a mobility management entity (MME), or an access management function (AMF). However, the disclosure is not limited thereto.

The term 'user plane entity' used herein may refer to an entity that transmits and processes user data (e.g., a packet, a flow, or traffic) in a network. Examples of the user plane entity may include, but are not limited to, a user plane gateway (e.g., a GW UP or a GW-U) and a user plane function (UPF).

The term 'control plane entity' used herein may refer to an entity that transmits and processes control data. Examples of the control plane entity may include, but are not limited to, a control plane gateway (e.g., a GW CP or a GW-C) and a session management function (SMF).

The term 'traffic' used herein may refer to data that is transmitted/received. The data that is transmitted/received may be, but is not limited to, a packet according to some embodiments of the disclosure.

The term 'quality of service (QoS) policy' used herein may refer to a policy of differentially managing service levels according to importance. For example, a QoS control policy may refer to a policy for determining a priority according to an application, a user, or a type of traffic according to a predetermined criterion and controlling traffic that is transmitted/received according to the priority. Also, the QoS control policy may refer to a policy for determining a QoS requirement and controlling traffic that is transmitted/received to satisfy the determined QoS requirement. However, the disclosure is not limited thereto, and examples of the QoS control policy may include various other policies for differentially managing service levels according to importance.

As used herein, the term "and/or" includes any and all combinations of one or more of the associated listed items. Expressions such as "at least one of", when preceding a list of elements, modify the entire list of elements and do not modify the individual elements of the list.

Throughout the disclosure, the expression "at least one of a, b or c" indicates only a, only b, only c, both a and b, both a and c, both b and c, all of a, b, and c, or variations thereof.

FIG. 1 is a view illustrating a structure of a communication system according to an embodiment.

FIG. 1 illustrates structures of LTE and 5G communication systems according to an embodiment. Referring to FIG. 1, a user terminal (e.g., UE) 101 may use both LTE and 5G communication methods. The user terminal 101 may be connected to an eNodeB 102 that is an LTE base station when the LTE communication system is used, and the eNodeB 102 may be connected to an evolved packet core (EPC) that is a core network (CN) 120 of the LTE communication system.

Also, the user terminal 101 may be connected to a gNodeB 103 that is a next-generation base station when a next-generation mobile communication method (e.g., new radio (NR) communication method) is used, and the gNodeB 103 may be connected to a 5G core that is a CN 130 of an NR communication system. The NR communication system may be referred to as a 5G communication system, and 5G and NR may be interchangeably used below.

Although the LTE and NR communication systems are separately illustrated in FIG. 1, for convenience of explanation, it is obvious to one of ordinary skill in the art that the LTE and the NR communication systems may interoperate with each other. The user terminal 101 may be used along with the NR communication system and the LTE communication system by using a function such as LTE-NR dual connectivity.

According to some embodiments of the disclosure, connection between the user terminal 101 and the eNodeB 102 and the gNodeB 103 may be referred to a RAN, and the eNodeB 102 and the gNodeB 103 may be connected to the CNs 120 and 130 and may be connected to a data network (e.g., a data server or the Internet) through data processing entities in the CNs 120 and 130.

According to some embodiments of the disclosure, because all user traffic is served through a shared channel in the LTE or NR communication system, an apparatus for performing scheduling by collecting state information such as buffer states, available transfer power states, and channel states of the user terminals 101 may be required, and the eNodeB 102 or the gNodeB 103 may perform the function of the apparatus. One of the eNodeB 102 and the gNodeB 103 may typically control a plurality of cells, and may use a radio access technology based on orthogonal frequency division multiplexing (OFDM) or a beamforming technology. Also, the eNodeB 102 or the gNodeB 103 may use adaptive modulation and coding (AMC) that determines a modulation scheme and a channel coding rate according to a channel state.

According to some embodiments of the disclosure, the CN 120 or 130 may enable traffic to be transmitted/received by establishing and managing a session with an external network. For example, various entities in the CN 120 or 130 may perform various operations so as for the user terminal 101 to communicate with an external network, such as an operation of supporting the mobility of the user terminal 101, an operation of establishing a session, or an operation of setting QoS. The entities in the CN 120 or 130 will be described in detail with reference to FIGS. 2 and 3.

Figure 2:
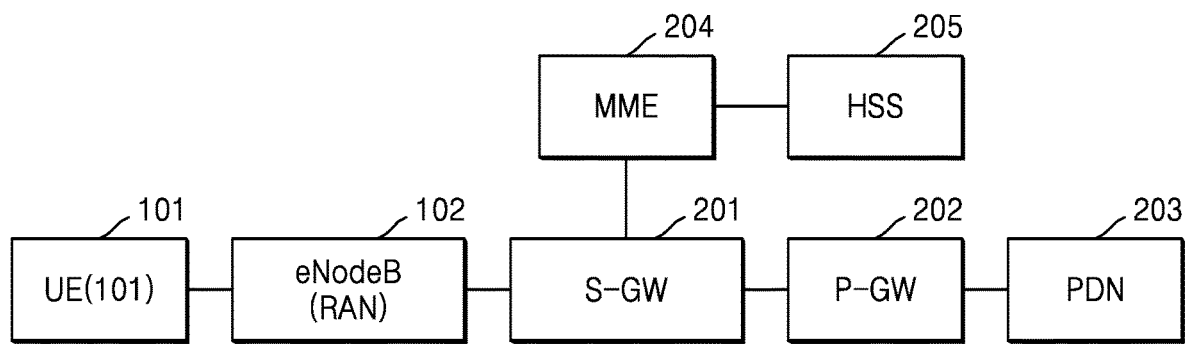
FIG. 2 is a block diagram illustrating a structure of a radio access network (RAN) and an evolved packet core (EPC) of a long term evolution (LTE) communication system, according to an embodiment.

FIG. 2 is a block diagram illustrating structures of a radio access network (RAN) and an EPC of an LTE communication system 200, according to some embodiments of the disclosure.

The LTE communication system 200 is not limited to the example of FIG. 2, and the LTE communication system 200 may include entities more or fewer than the entities illustrated in FIG. 2.

According to some embodiments of the disclosure, the user terminal 101 may include various devices that may use a communication system as described above, and each user terminal 101 may include a module for authenticating and identifying a subscriber of a communication system.

According to some embodiments of the disclosure, the eNodeB 102 may provide wireless connection between the user terminal 101 and a CN, and may perform scheduling by collecting state information such as buffer states, available transfer power states, and channel states of the user terminals 101, as described above.

Connection between the user terminal 101 and the eNodeB 102 may be referred to as a RAN, and a part (e.g., a serving gateway (S-GW) 201 or a packet data network (PDN) gateway (P-GW) 202) other than the connection between the user terminal 101 and the eNodeB 102 may be referred to as a CN. As described above, the CN of the LTE communication system 200 is also referred to as an EPC.

According to some embodiments of the disclosure, the S-GW 201 that is an entity for forwarding data (or a data packet) may be a user plane entity. The S-GW 201 may serve as an anchor point during handover between the eNodeBs 102 or with another communication network. The S-GW 201 would be intuitively inferred from its name by one of ordinary skill in the art, and thus a detailed explanation thereof will not be given here.

According to some embodiments of the disclosure, the P-GW 202 may be an entity that provides connectivity between the user terminal 101 and a PDN 203 that is an external network. For example, the P-GW 202 may assign an Internet protocol (IP) address to the user terminal 101, may serve as an anchor point during handover between the S-GWs 201, may use a QoS control policy, and may check usage for billing. The P-GW 202 would be intuitively inferred from its name by one of ordinary skill in the art, and thus a detailed explanation thereof will not be given here.

According to some embodiments of the disclosure, the S-GW 201 and the P-GW 202 may be divided into a GW-C (GW CP) and a GW-U (GW UP) by function, and the GW-C may be a control plane entity and the GW-U may be a user plane entity.

According to some embodiments of the disclosure, the PDN 203 may be an external network such as the Internet or an external server.

According to some embodiments of the disclosure, an MME 204 authenticates the user terminal 101, manages a session such as a bearer, and manages a connectivity state of the user terminal 101. The MME 204 would be intuitively inferred from its name by one of ordinary skill in the art, and thus a detailed explanation thereof will not be given here.

According to some embodiments of the disclosure, a home subscriber server (HSS) 205 that is an entity containing information for authenticating the user terminal 101 may store QoS class information (e.g., priority information or information about a maximum bandwidth). The HSS 205 would be intuitively inferred from its name by one of ordinary skill in the art, and thus a detailed explanation thereof will not be given here.

Although not shown in FIG. 2, an entity such as a policy and charging rule function (PCRF), a subscriber profile repository (SPR), an online charging system (OCS), or an offline charging system (OFCS) may be further included in the EPC that is the CN of the LTE communication system

200. The PCRF (not shown) may be an entity that determines a billing policy and a QoS policy to be applied to the user terminal 101, and the SPR (not shown) may be an entity that stores the billing policy and the QoS policy determined by the PCRF. The OCS (not shown) and the OFCS (not shown) may be entities that manage usage and billing. The entities that may be included in the CN would be intuitively inferred from their names by one of ordinary skill in the art, and thus a detailed explanation thereof will not be given here.

Also, according to some embodiments of the disclosure, each entity may perform communication by using a predetermined interface. For example, the eNodeBs 102 may communicate with each other by using an X2 interface, and the eNodeB 102 and the S-GW 201 may communicate with each other by using an S1 interface. Other entities may perform communication by using predetermined interfaces. An interface for communication between entities would be obvious to one of ordinary skill in the art, and thus a detailed explanation thereof will not be given here.

Figure 3:
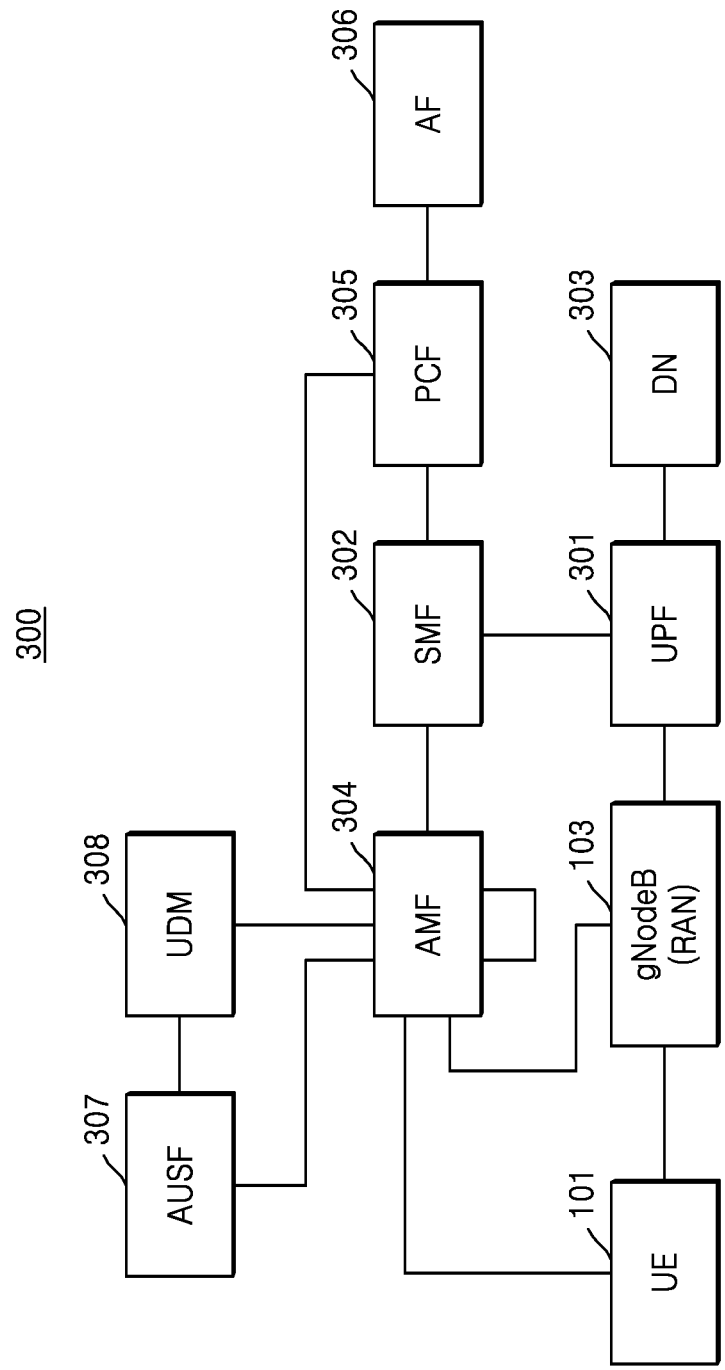
FIG. 3 is a block diagram illustrating structures of a RAN and a core network (CN) of a 5G communication system according to an embodiment.

FIG. 3 is a block diagram illustrating structures of a RAN and a CN of a 5G communication system 300 according to some embodiments of the disclosure.

The 5G communication system 300 is not limited to an example of FIG. 3, and the 5G communication system 300 may include more or fewer entities than those illustrated in FIG. 3. Also, in the 5G communication system 300 of FIG. 3, entities are differentially illustrated according to network functions.

The user terminal 101 is the same as that described above, and thus a detailed explanation thereof will not be given here.

According to some embodiments of the disclosure, the gNodeB 103 may correspond to the eNodeB 102 of the LTE communication system 200. Since the gNodeB 103 uses a 5G communication method, the gNodeB 103 may use a wireless communication technology that is the same as or different from LTE, and may provide a service more quickly and more efficiently to the user terminal 101 than the eNodeB 102. Examples of a base station used herein may include both an eNodeB and a gNodeB.

According to some embodiments of the disclosure, a user plane function (UPF) 301 that is an entity for forwarding user data may be a user plane entity.

According to some embodiments of the disclosure, a session management function (SMF) 302 may be an entity that manages a session. When the user terminal 101 has a plurality of sessions, the SMF 302 may be assigned to each of the plurality of sessions, and thus the user terminal 101 may be connected to at least one SMF 302. An access and mobility function (AMF) 304 is an entity that manages the access and mobility of a terminal, and the user terminal 101 may be connected to one AMF 304.

Also, according to some embodiments of the disclosure, the SMF 302 and the AMF 304 may be control plane entities, and the UPF 301 and the SMF 302 may respectively correspond to the GW-U and the GW-C of FIG. 2.

According to some embodiments of the disclosure, a data network (DN) 303 may refer to a data network, and may correspond to the PDN of FIG. 2. The DN 303 may transmit a packet data unit (PDU) to be transmitted to the user terminal 101 to the UPF 301, and may receive a PDU transmitted by the user terminal 101 through the UPF 301.

According to some embodiments of the disclosure, a policy control function (PCF) 305 may be an entity that determines a billing-related policy. An application function (AF) 306 may be an entity that provides information about packet flows for guaranteeing QoS.

According to some embodiments of the disclosure, an authentication server function (AUSF) 307 may be an entity that stores information for authenticating the user terminal 101, and a unified data management (UDM) 308 may be an entity that stores information about a user. The entities that may be included in a 5G CN would be intuitively inferred from their names by one of ordinary skill in the art, and thus a detailed explanation thereof will not be given here.

Also, according to some embodiments of the disclosure, each entity may perform communication by using a predetermined interface. For example, the gNodeB 103 and the UPF 301 may communicate with each other by using an NG3 interface, and the UPF 301 and the SMF 302 may communicate with each other by using an NG4 interface. Other entities may perform communication by using predetermined interfaces, which would be obvious to one of ordinary skill in the art and thus a detailed explanation thereof will not be given here.

According to some embodiments of the disclosure, a user plane entity such as the UPF 301 may have a structure that may concentrate only on packet processing to quickly process user data, and a control plane entity such as the SMF 302 may be an entity having various functions to control a terminal and a network.

Accordingly, the UPF 301 may not store session information in the UPF 301 to quickly process data and reduce costs. For example, the UPF 301 may have a stateless virtual network function (VNF) structure, and thus, the UPF 301 may not store session information. That is, the UPF 301 may be implemented as a module or a device such as a SDN switch or a white box switch, and may not store session information at all or may store only part of session information in a storage such as a cache.

However, when a failure occurs in the UPF 301, session information is not included in the UPF 301, thereby making it difficult to continuously provide a service to the user terminal 101. Accordingly, a method of more efficiently managing session information will now be described.

Figure 4:
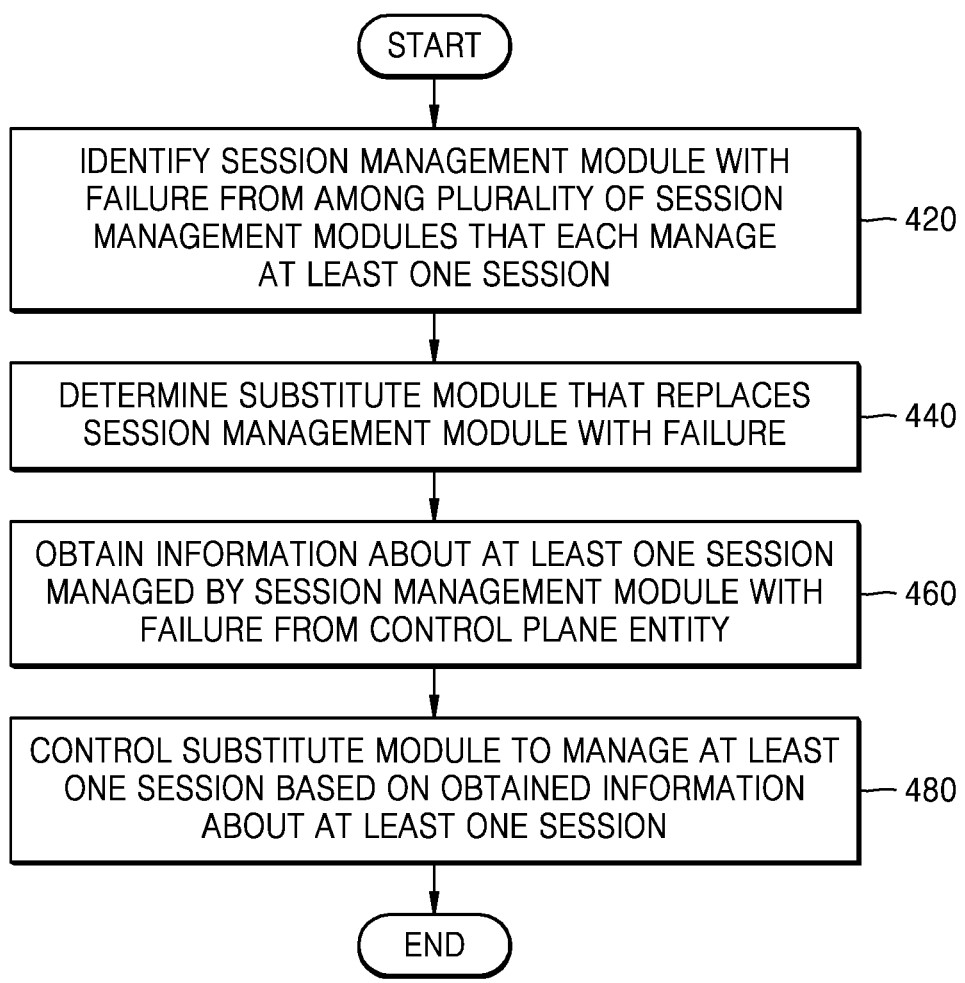
FIG. 4 is a flowchart illustrating a session management method of a low plane entity, according to an embodiment.

FIG. 4 is a flowchart illustrating a session management method of a user plane entity, according to some embodiments of the disclosure.

In operation 420, a user plane entity may identify a session management module in which a failure occurs (referred to as the session management module with the failure) from among a plurality of session management modules that each manage at least one session.

According to some embodiments of the disclosure, at least one session management module may be included in the user plane entity. The at least one session management module may be implemented as software, or hardware such as a memory and a processor, or a combination of the two.

According to some embodiments of the disclosure, each of the at least one session management module may manage at least one session. For example, a first session management module included in the user plane entity may manage first through $50^{th}$ sessions, and a second session management module may manage $51^{st}$ through $100^{th}$ sessions.

According to some embodiments of the disclosure, session management of the user plane entity may include at least one of, but not limited to, an operation of forwarding data transmitted/received through a session connected between a user terminal and a DN and an operation for maintaining an established session.

According to some embodiments of the disclosure, the term 'failure' may refer to a state where a session may not be normally managed. For example, the failure may refer to any of a software failure such as an error in a program that performs an operation of a module and a physical failure such as power cut-off. The disclosure is not limited thereto, and the failure may refer to any state where a module or an entity may not manage at least one session for a certain reason. Session management may include all session-related operations such as operations of maintaining, creating, or updating a session.

According to some embodiments of the disclosure, the user plane entity may identify the session management module with the failure by using any of various methods. For example, the user plane entity may identify the session management module with the failure by monitoring traffic flow in the user plane entity or receiving feedback information from each session management module. However, the disclosure is not limited thereto, and the user plane entity may detect whether a failure occurs by using any of methods and may identify a session management module with the failure.

In operation 440, the user plane entity may determine a substitute module that may replace the session management module with the failure.

According to some embodiments of the disclosure, when the session management module with the failure is identified, the user plane entity may switch the session management module with the failure to the substitute module. For example, the user plane entity may end and restart a module operation so that a standby module may manage a session managed by the session management module with the failure by using a method such as clustering of a virtual network function component (VNFC). Also, the term 'switch' used herein may include the meaning of failover. The failover refers to switching to a preliminary system upon the failure to handle the failure. However, the disclosure is not limited to the above example.

According to some embodiments of the disclosure, when failures occur in a plurality of modules, the user plane entity may determine a substitute module that is to replace the modules with the failures simultaneously or sequentially and may switch the modules with the failures to the substitute module.

In operation 460, the user plane entity may obtain information about at least one session managed by the session management module with the failure from a control plane entity.

According to some embodiments of the disclosure, the information about the at least one session may include at least one of QoS information, billing information, UE address information, or terminal equipment (TE) address information. Also, according to some embodiments of the disclosure, the information of the at least one session may be individual, and may include the QoS information, the billing information, and the UE and TE address information for each session.

Also, according to some embodiments of the disclosure, the user plane entity may transmit a request to the control plane entity for the information about the at least one session managed by the session management module with the failure. Also, the user plane entity may receive the information about the at least one session managed by the session management module with the failure from the control plane entity.

According to some embodiments of the disclosure, the user plane entity may transmit to the control plane entity a message including at least one of information about address information of the substitute module and a session identifier of the at least one session managed by the session management module with the failure.

Also, according to some embodiments of the disclosure, the user plane entity may transmit a request for the information about the at least one session by using a N4 association setup request message or an Sx association setup request message. The disclosure is not limited thereto, and a name of the message would be partially or entirely changed as long as it is obvious to one of ordinary skill in the art.

Also, according to some embodiments of the disclosure, the user plane entity may receive the information about the at least one session managed by the session management module with the failure from the control plane entity according to sessions. For example, the user plane entity may receive session information managed by a session management module from the control plane entity at once or according to each session.

Also, according to some embodiments of the disclosure, the user plane entity may obtain the information about the at least one session managed by the session management module with the failure through a PDU session establishment request message or a create session request message. The disclosure is not limited thereto, and a name of the message would be partially or entirely changed as long as it is obvious to one of ordinary skill in the art.

In operation 480, the user plane entity may control the substitute module to manage the at least one session based on the obtained information about the at least one session. In other words, sessions managed by the session management module with the failure may be managed by the substitute module.

Also, according to some embodiments of the disclosure, the session management module with the failure may exist as a standby module after recovery.

Accordingly, the user plane entity may recover the session management module with the failure by using a message in the 3GPP standard, and may restart a service more quickly than in a case where the user terminal newly creates a session. Also, the disclosure may be applied to both an LTE communication service and a 5G communication service, and may also be applied to a geo-redundancy method of replicating data according to locations and a VNF redundancy method of replicating data according to modules.

FIGS. 5 through 10 are diagrams illustrating a method of managing a session when a failure occurs between a user plane entity and a control plane entity, according to some embodiments of the disclosure.

Figure 5:
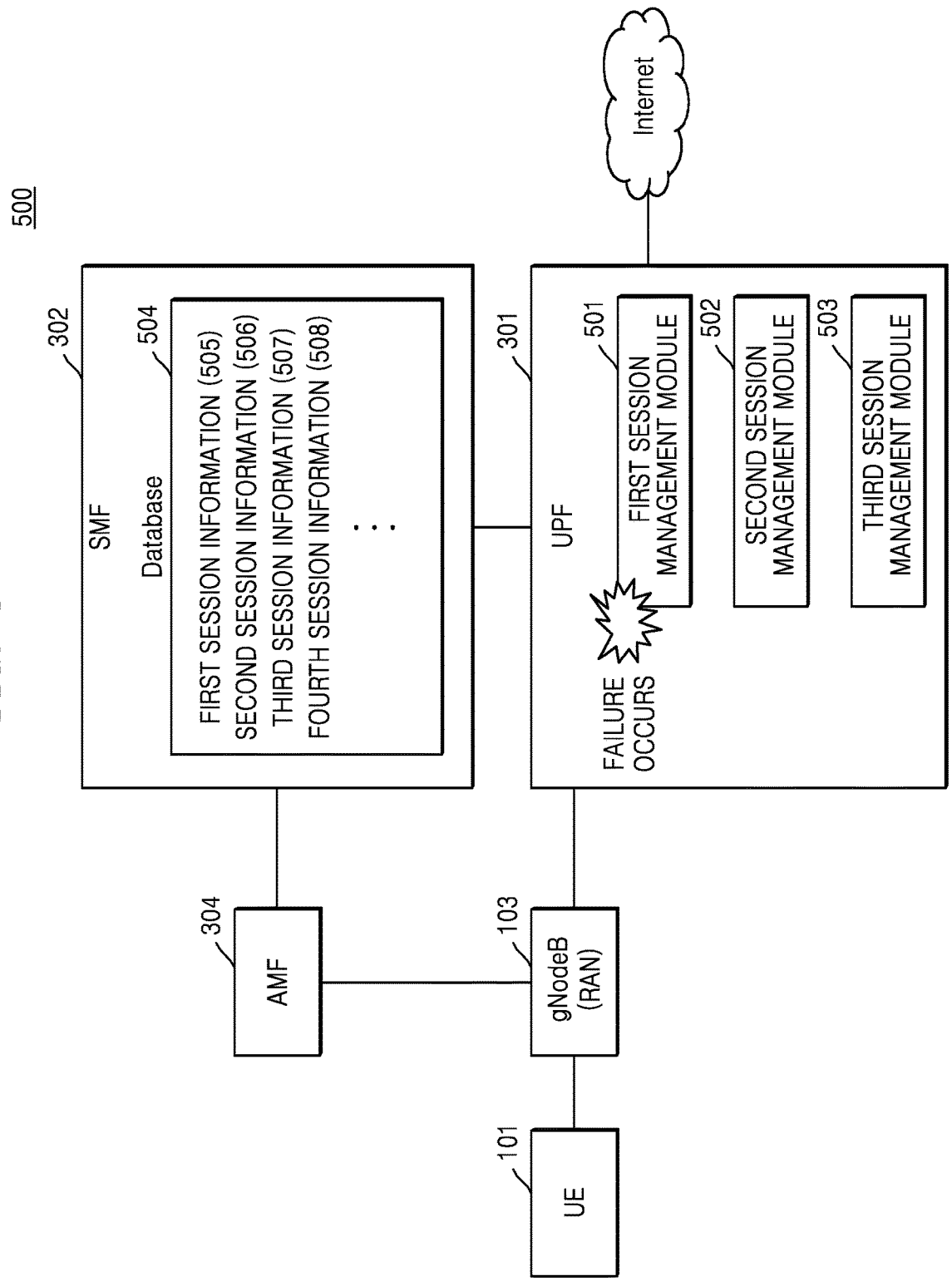
FIG. 5 is a block diagram illustrating a method of managing a session when a failure occurs between a user plane entity and a control plane entity, according to an embodiment.

FIG. 5 is a diagram illustrating a system 500, illustrating only some elements of the 5G communication system 300 of FIG. 3.

According to some embodiments of the disclosure, the UPF 301 may include a first session management module 501, a second session management module 502, and a third session management module 503. Also, the first session management module 501 through the third session management module 503 may include a cache. Also, the first session management module 501 through the third session management module 503 may include at least one processor. The number of modules included in the UPF 301 is not limited.

Also, according to some embodiments of the disclosure, the UPF 301 may further include an operations, administration, and maintenance (OAM) module and a load balancing (LB) module. The OAM module and the LB module may be implemented as software or hardware, or a combination of the two and may include at least one processor. However, the disclosure is not limited thereto.

According to some embodiments of the disclosure, the OAM module may be a module for operating and managing the UPF 301. Also, the LB module may be a module that adjusts a load on a plurality of modules such as the first session management module 501 through the third session management module 503 in the UPF 301. The OAM module and the LB module would be intuitively inferred from their names by one of ordinary skill in the art, and thus a detailed explanation thereof will not be given here.

According to some embodiments of the disclosure, the SMF 302 may include a database 504 including a plurality of pieces of session information. The database 504 may include first session information 505, second session information 506, third session information 507, and fourth session information 508. The number of pieces of session information stored in the database 504 is not limited.

According to some embodiments of the disclosure, the database 504 may group and store session information according to each module in the UPF 301. For example, when it is assumed that session information of a session managed by the first session management module 501 is the first session information 505 and the second session information 506, and session information of a session managed by the second session management module 502 is the third session information 507 and the fourth session information 508, the database 504 may group and store the first session information 505 and the second session information 506, and the third session information 507 and the fourth session information 508.

In other words, the database 504 may group and store session information based on an identifier (ID) (e.g., a fully qualified connection set identifier (FQ-CSID)) that identifies sessions managed by modules. However, the disclosure is not limited thereto, and a method of storing session information in the database 504 is not limited.

Although the UPF 301 and the SMF 302 of the 5G communication system 300 are illustrated in FIGS. 5 through 10 for convenience of explanation, an operation of the UPF 301 may correspond to an operation of a GW-U, and an operation of the SMF 302 may correspond to an operation of a GW-C. Accordingly, the UPF 301 and the GW-U may be user plane entities and the SMF 302 and the GW-C may be control plane entities, as described above.

According to some embodiments of the disclosure, the UPF 301 may identify a session management module with a failure from among a plurality of session management modules. Referring to FIG. 5, the UPF 301 may detect that a failure occurs, and may identify that a session management module with the failure is the first session management module 501.

Figure 6:
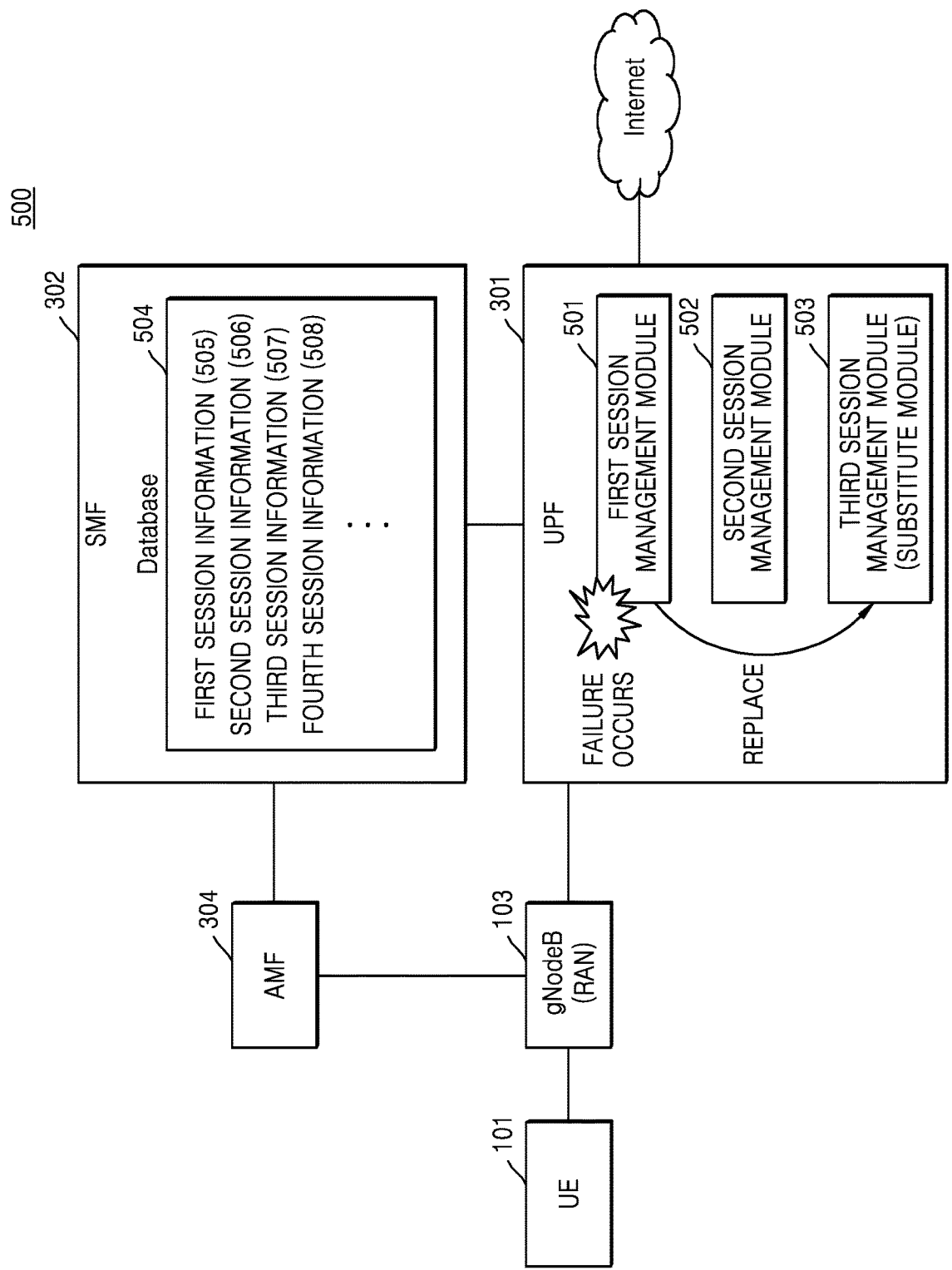
FIG. 6 is a block diagram illustrating a method of managing a session when a failure occurs between a user plane entity and a control plane entity, according to an embodiment.

The UPF 301 detecting that the failure occurs may determine a substitute module. Referring to FIG. 6, the third session management module 503 may be determined as the substitute module. The third session management module 503 may be a standby module. The standby module may be an auxiliary module that does not manage a session or has a small load. However, the disclosure is not limited thereto.

According to some embodiments of the disclosure, the OAM module or the LB module of the UPF 301 may determine a substitute module. Once the substitute module is determined, the UPF 301 may switch the first session management module 501 to the third session management module 503.

Figure 7:
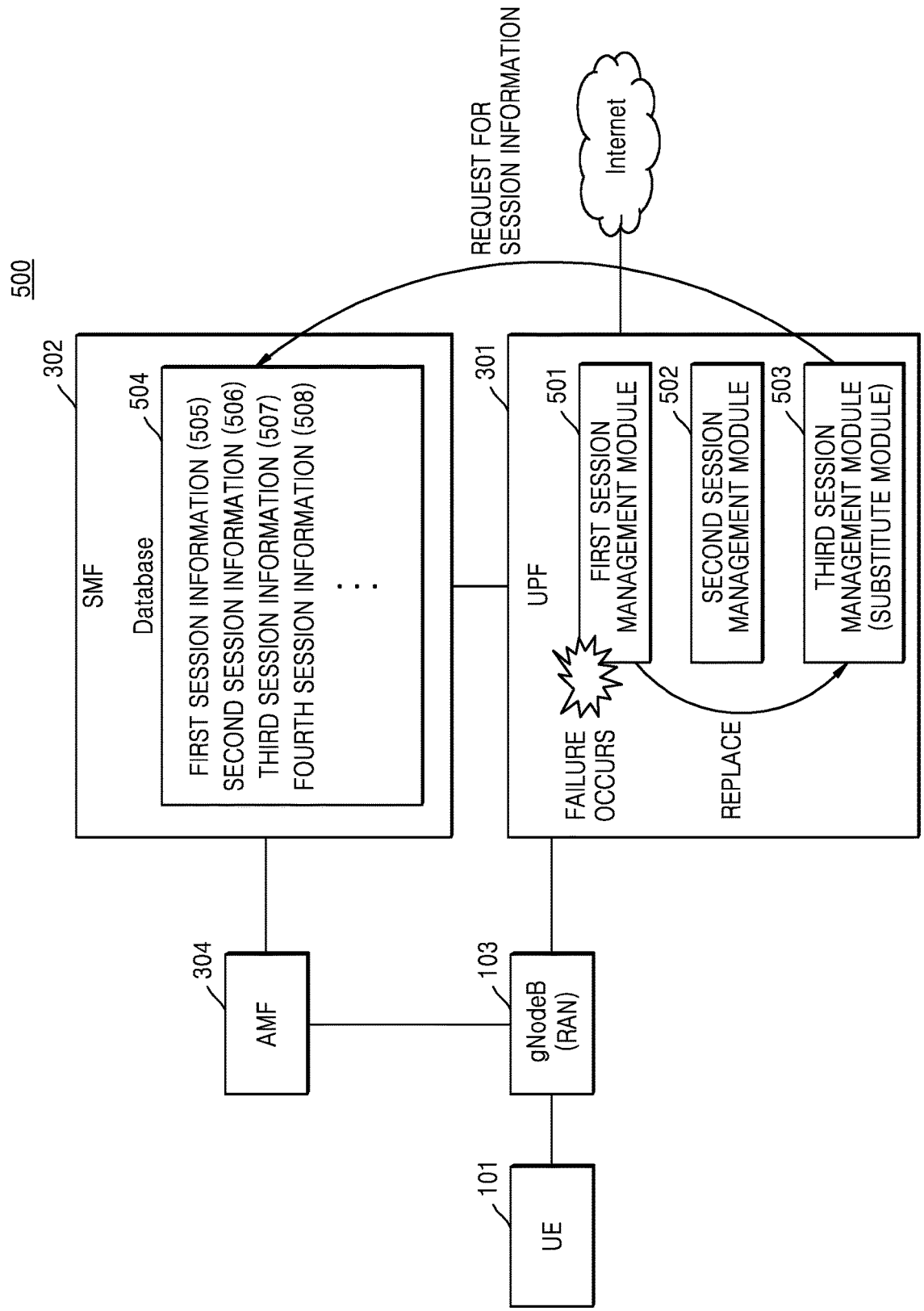
FIG. 7 is a block diagram illustrating a method of managing a session when a failure occurs between a user plane entity and a control plane entity, according to an embodiment.

Referring to FIG. 7, after the substitute module is determined, the UPF 301 may request the SMF 302 for session information. In detail, the UPF 301 may request the SMF 302 for session information about a session managed by the first session management module 501.

When the UPF 301 requests the SMF 302 for the session information, the UPF 301 may transmit session identifier information. For example, the UPF 301 may transmit the session information managed by the first session management module 501 through an FQ-CSID. Also, according to some embodiments of the disclosure, the session information may be requested through a N4 association setup request message.

Also, according to some embodiments of the disclosure, the UPF 301 may transmit address information of the substitute module. For example, when the UPF 301 requests the SMF 302 for the session information, the UPF 301 may set and transmit address information of the third session management module 503 so that the third session management module 503 receives the session information received from the SMF 302.

Figure 8:
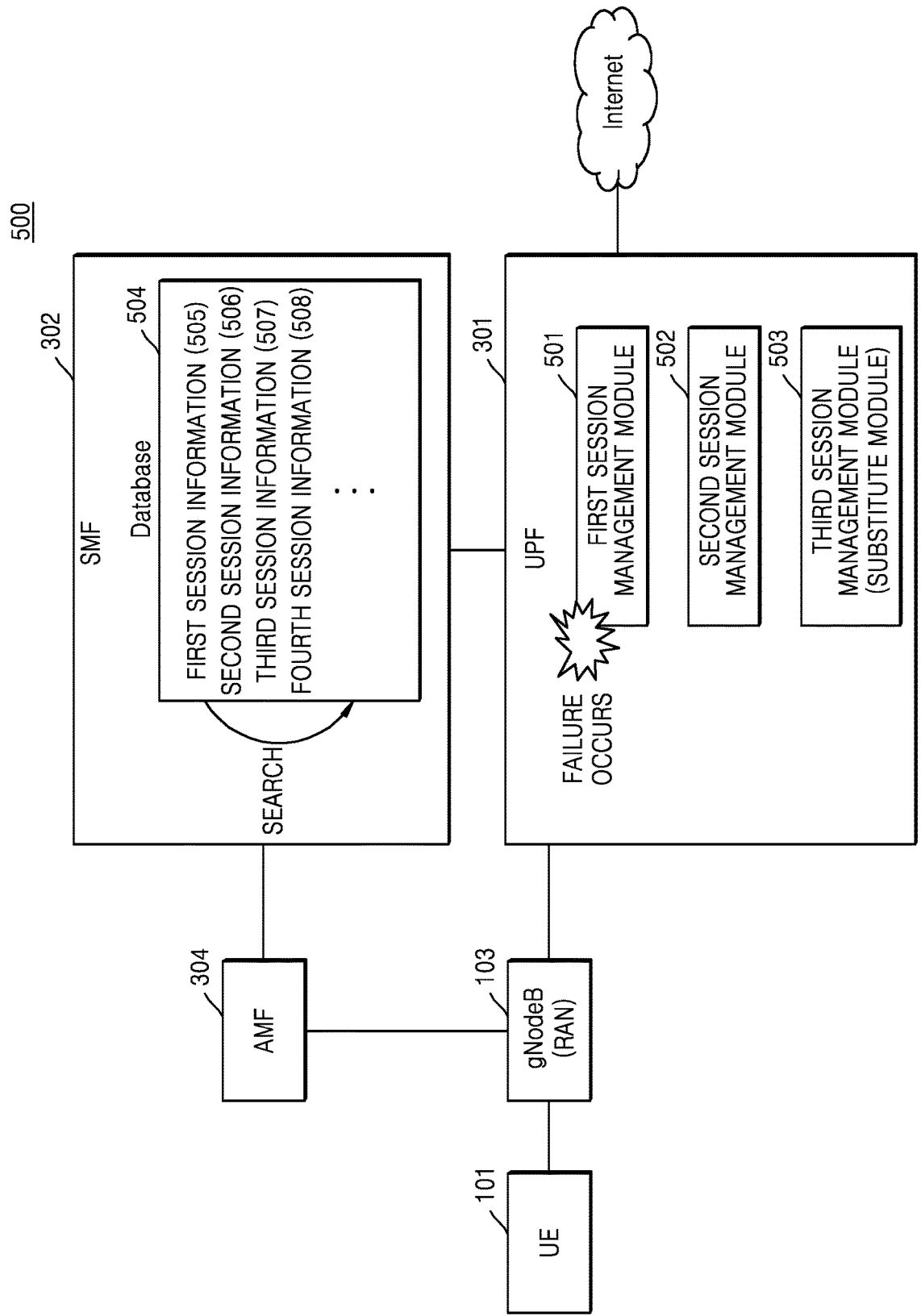
FIG. 8 is a block diagram illustrating a method of managing a session when a failure occurs between a user plane entity and a control plane entity, according to an embodiment.

Referring to FIG. 8, the SMF 302 may search the database 504 based on the request for the session information received from the UPF 301. According to some embodiments of the disclosure, the SMF 302 may search for the session information based on the session identifier information received from the UPF 301. For example, the SMF 302 may search the database 504 based on the FQ-CSID received from the UPF 301.

According to some embodiments of the disclosure, when the session information requested by the UPF 301 is stored in the database 504, the SMF 302 may determine that it is a procedure for handling the failure. When the session information requested by the UPF 301 is not stored in the database 504, the SMF 302 may determine that it is a procedure for setting a new session.

For example, when the session information requested by the UPF 301 is stored in the database 504, the SMF 302 may determine that the received request is a session restoration trigger message. When the session information requested by the UPF 301 is not stored in the database 504, the SMF 302 may determine that the received request is a new N4 setup request message.

Figure 9:
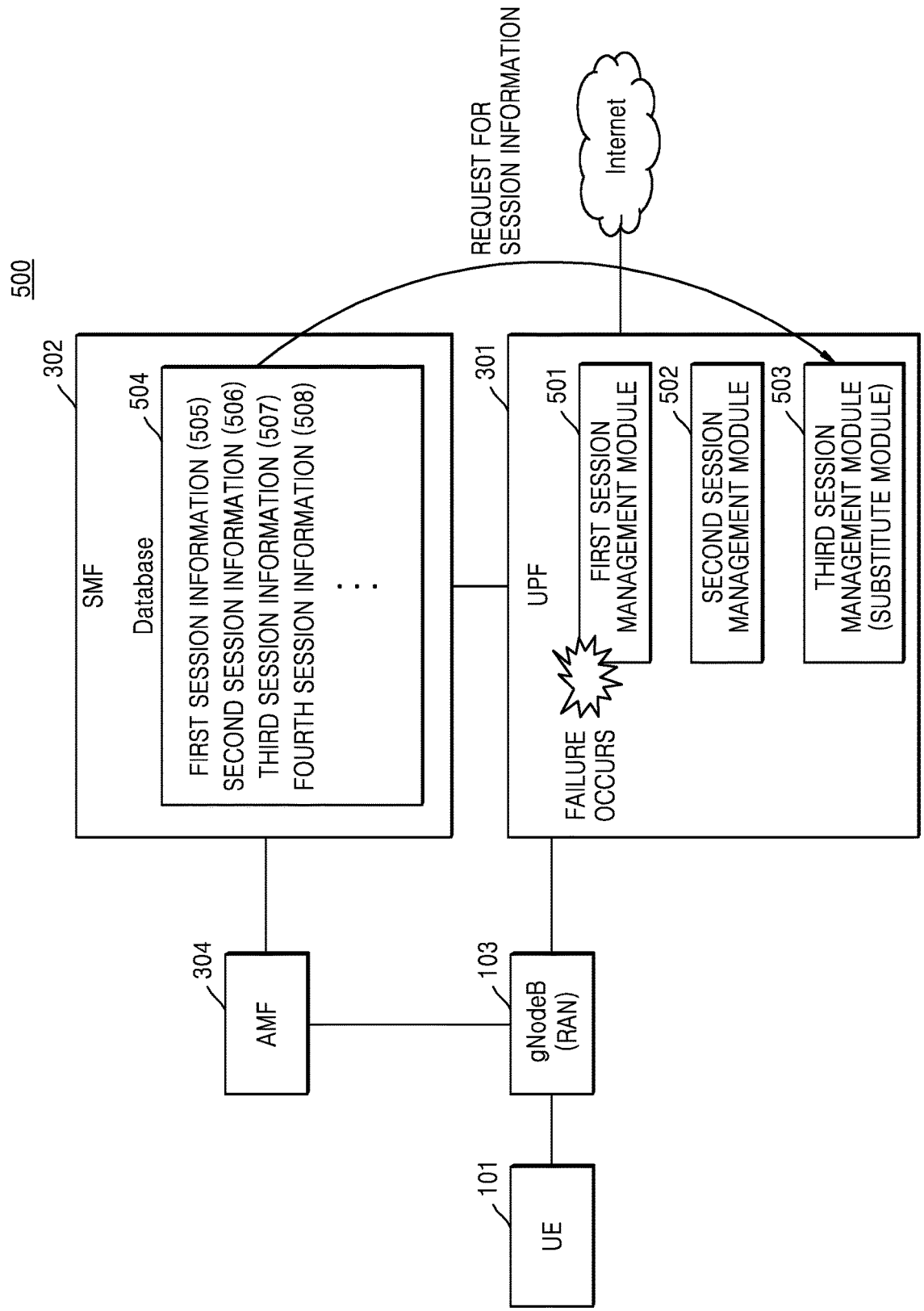
FIG. 9 is a block diagram illustrating a method of managing a session when a failure occurs between a user plane entity and a control plane entity, according to an embodiment.

Referring to FIG. 9, the SMF 302 may transmit the session information requested by the UPF 301 to the UPF 301. According to some embodiments of the disclosure, the SMF 302 may transmit the session information requested in FIG. 7 to the third session management module 503 that is the substitute module.

According to some embodiments of the disclosure, the SMF 302 may transmit the session information according to each session. For example, the SMF 302 may transmit the session information through a create session request message according to each session. Alternatively, the SMF 302 may transmit the session information at one time without transmitting the session information according to each session.

Figure 10:
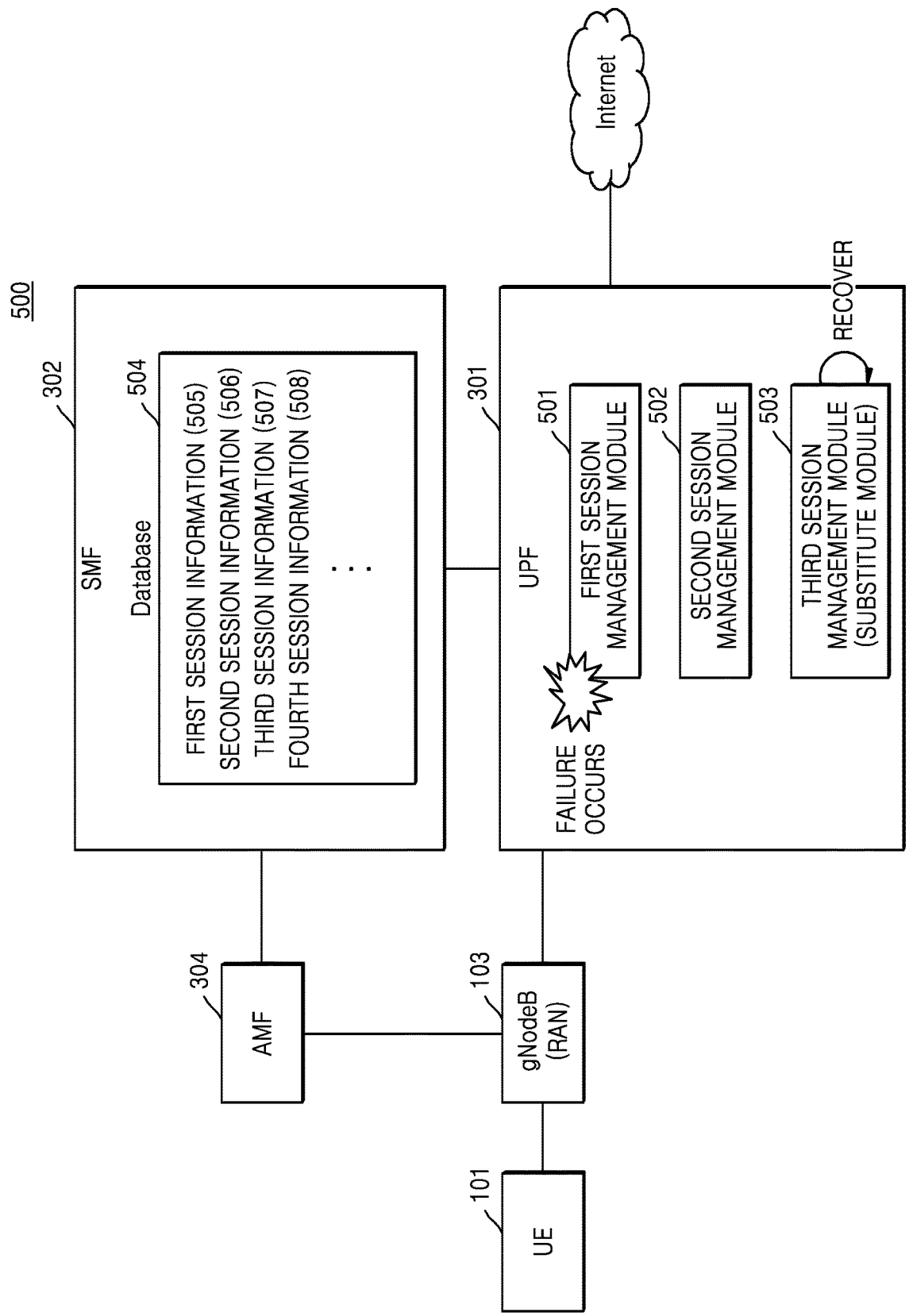
FIG. 10 is a block diagram illustrating a method of managing a session when a failure occurs between a user plane entity and a control plane entity, according to an embodiment.

Referring to FIG. 10, the UPF 301 may overcome the failure by using the third session management module 503. In other words, the UPF 301 may control the third session management module 503 to manage the session managed by the first session management module 501 based on session management information received from the SMF 302.

According to some embodiments of the disclosure, the session management method of FIGS. 5 through 10 is not be limited to a failure in a specific session management module in the UPF 301, and may be applied even when a failure occurs in the entire UPF 301.

Figure 11:
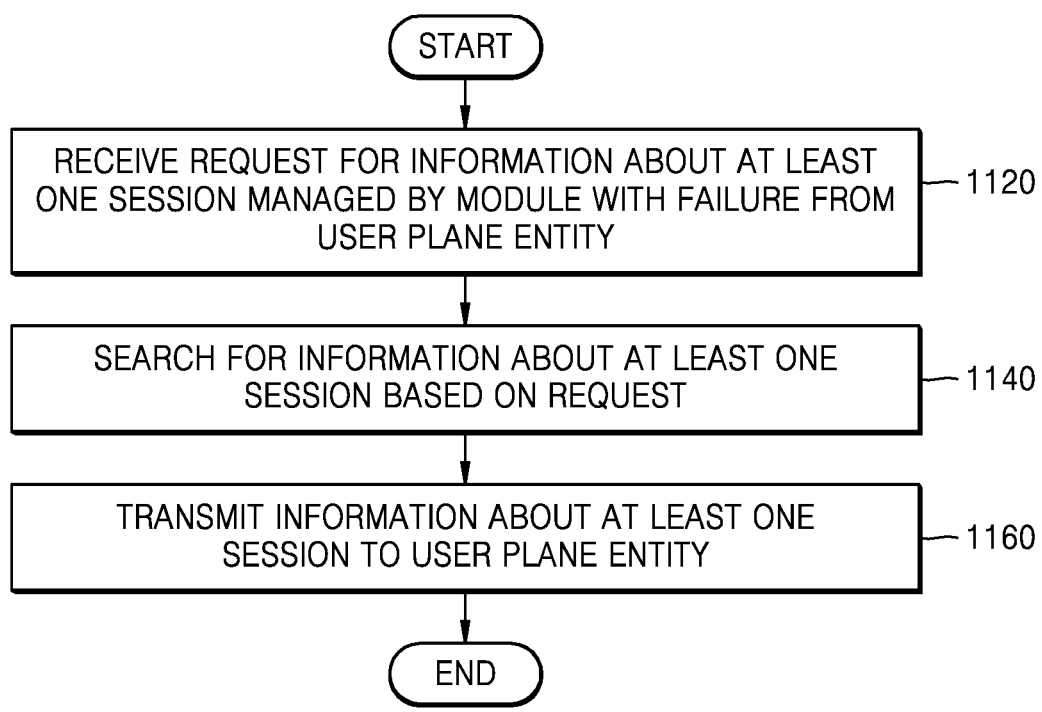
FIG. 11 is a flowchart illustrating a session management method of a control plane entity, according to an embodiment.

FIG. 11 is a flowchart of a session management method of a control plane entity according to some embodiments of the disclosure.

In operation 1120, a control plane entity may receive a request for session information about at least one session managed by a module with a failure from a user plane entity.

According to some embodiments of the disclosure, the control plane entity may obtain session identifier information from the user plane entity. For example, the control plane entity may receive an FQ-CSID that is an identifier of the at least one session managed by the module with the failure.

Also, according to some embodiments of the disclosure, the control plane entity may receive the request for the session information through a N4 association setup request message from the user plane entity.

Also, according to some embodiments of the disclosure, the control plane entity may receive address information of a substitute module. For example, the control plane entity may obtain the address information of the substitute module from the user plane entity.

In operation 1140, the control plane entity may search for the session information about the at least one session based on the request.

According to some embodiments of the disclosure, the control plane entity may search a database for the session information about the at least one session requested in operation 1120. Also, the control plane entity may search for the session information based on the session identifier information received from the user plane entity. For example, the control plane entity may search the database based on the FQ-CSID received from the user plane entity.

Also, according to some embodiments of the disclosure, when the session information requested in operation 1120 is stored in the database, the control plane entity may determine that it is a procedure for handling the failure. When the session information requested by the user plane entity is not stored in the database, the control plane entity may determine that it is a procedure of setting a new session.

For example, when the session information requested in operation 1120 is stored in the database, the user plane entity may determine that the received request is a session restoration trigger message. When the session information requested in operation 1120 is not stored in the database, the user plane entity may determine that the received request is a new N4 setup request message.

In operation 1160, the control plane entity may transmit the session information about the at least one session to the user plane entity.

According to some embodiments of the disclosure, the control plane entity may provide the session information about the at least session to the substitute module that replaces the module with the failure of the user plane entity.

According to some embodiments of the disclosure, the control plane entity may transmit the session information about the at least one session managed by the module with the failure according to sessions by using a PDU session establishment request message.

According to some embodiments of the disclosure, the control plane entity may transmit the session information according to each session. For example, the control plane entity may transmit the session information through a create session request message according to each session. Alternatively, the control plane entity may transmit the session information at one time without transmitting the session information according to each session.

Figure 12:
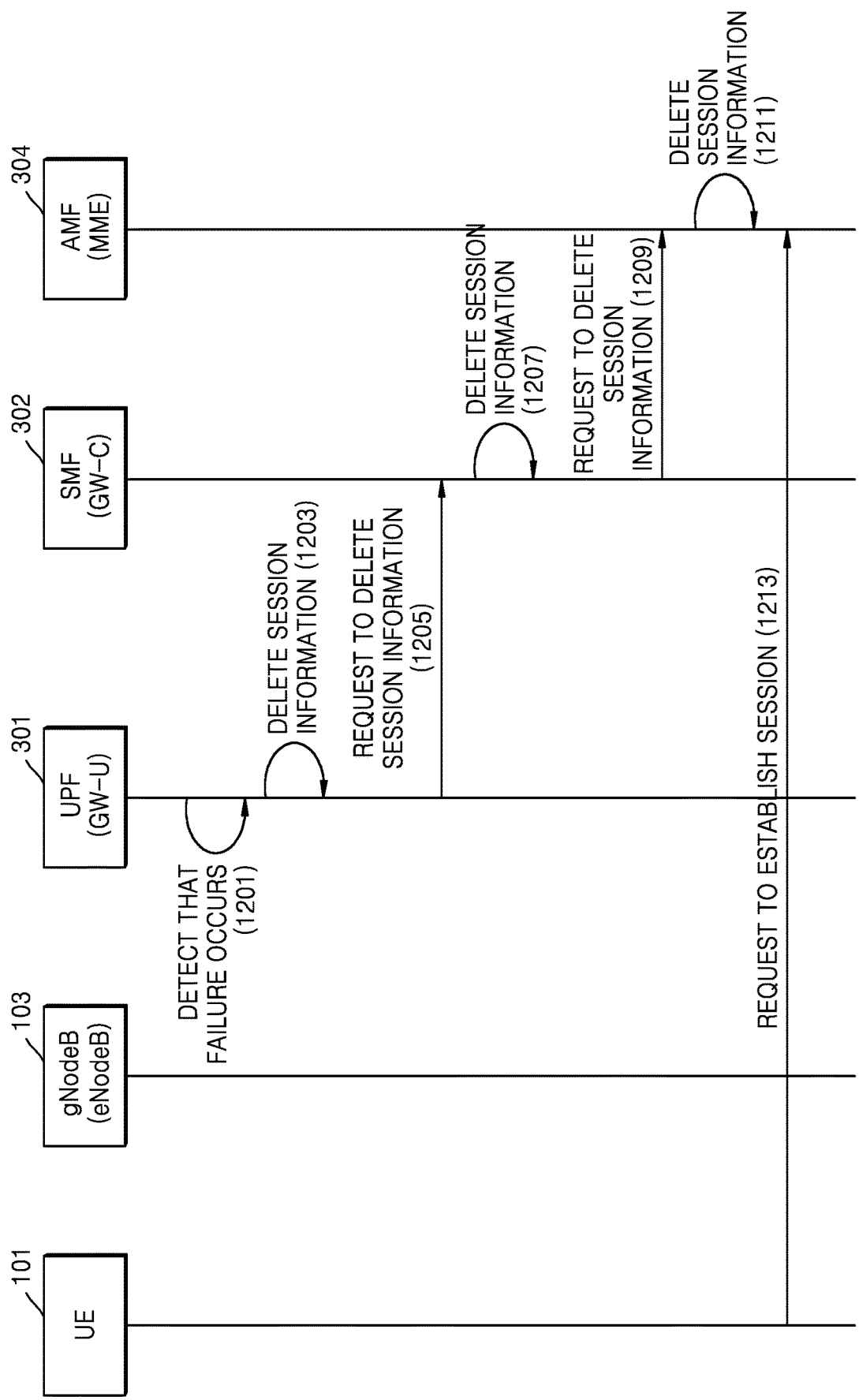
FIG. 12 is a flow diagram illustrating a failure recovery method when a failure occurs in a user plane entity, according to an embodiment.
Figure 13:
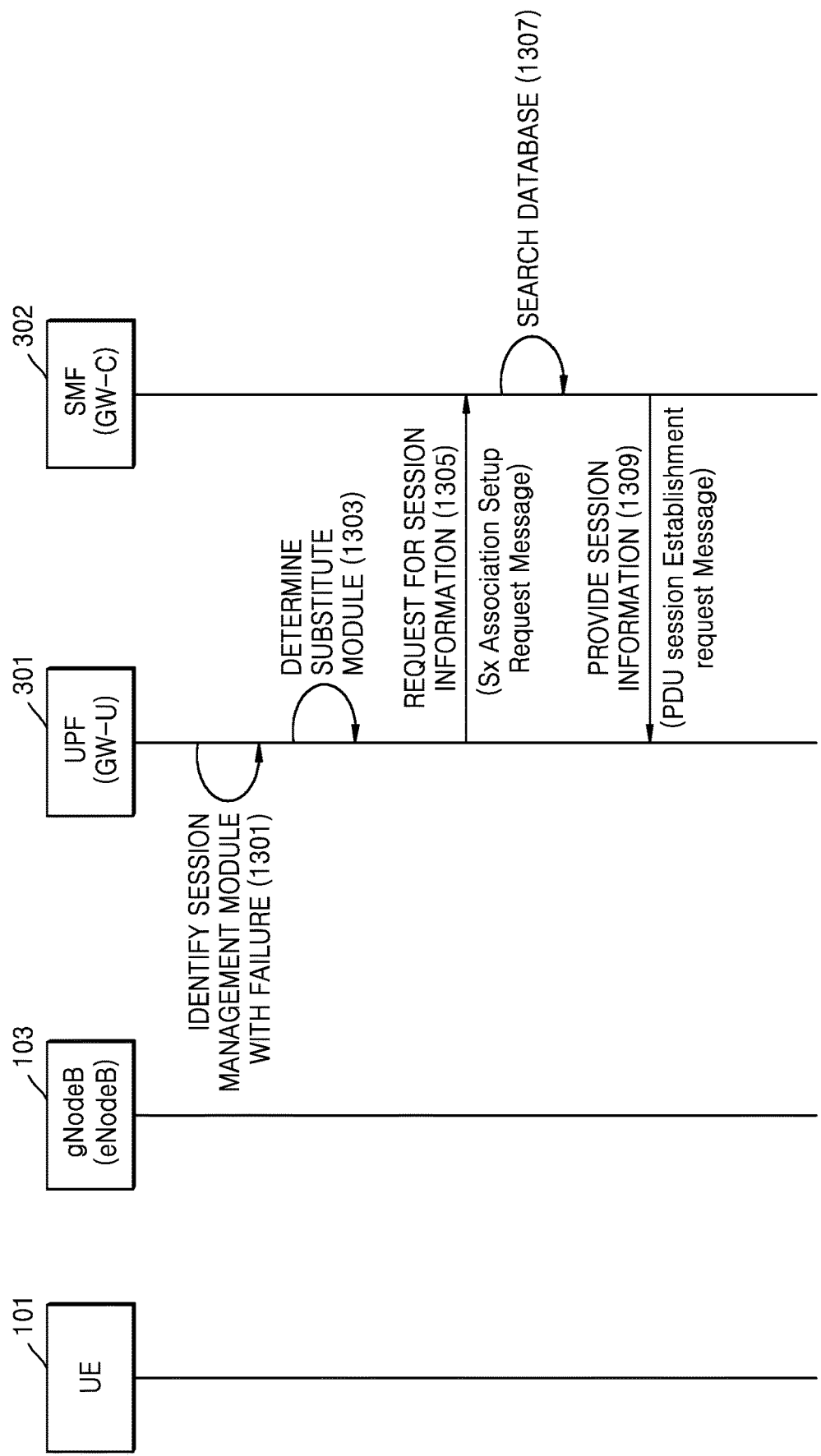
FIG. 13 is a flow diagram illustrating a failure recovery method when a failure occurs in a user plane entity, according to an embodiment.

FIGS. 12 and 13 are sequence flow diagrams for describing a failure recovery method when a failure occurs in a user plane entity according to some embodiments of the disclosure.

Although the UPF 301, the SMF 302, and the AMF 304 of the 5G communication system 300 are illustrated in FIGS. 12 through 13 for convenience of explanation, an operation of the UPF 301 may correspond to an operation of a GW-U, an operation of the SMF 302 may correspond to an operation of a GW-C, and the AMF 304 may correspond to an operation of an MME. Accordingly, the UPF 301 and the GW-U may be user plane entities and the SMF 302, the GW-C, the AMF 304, and the MME may be control plane entities as described above.

FIG. 12 is a sequence flow diagram for describing a failure recovery method of newly setting a session when a failure occurs.

In operation 1201, the UPF 301 may detect that a failure occurs.

According to some embodiments of the disclosure, the UPF 301 may identify a session management module with the failure, and may identify a session managed by the session management module with the failure, as described above.

In operation 1203, the UPF 301 may delete part or all of session information. For example, the UPF 301 may delete the session information managed by the session management module with the failure.

In operation 1205, the UPF 301 may request the SMF 302 to delete the session information managed by the session management module with the failure. The UPF 301 may transmit a session identifier (e.g., an FQ-CSID) for identifying a session managed by the session management module with the failure.

For example, the UPF 301 may request the SMF 302 to delete the session information by using a delete PDN connection set request message.

In operation 1207, the SMF 302 may delete the session information. In other words, the SMF 302 may delete the session information from a database based on the request session identifier received in operation 1205.

In operation 1209, the SMF 302 may request the AMF 304 to delete the session information managed by the session management module with the failure. For example, the SMF 302 may request the AMF 304 to delete the session information by using the delete PDN connection request message.

In operation 1211, the AMF 304 may delete the session information.

In operation 1213, the user terminal 101 may request to establish a session. In order to overcome the failure, the session information managed by the session management module with the failure may be deleted from the UPF 301, the SMF 302, and the AMF 304. Since the session information stored in the UPF 301, the SMF 302, and the AMF 304 is deleted, the user terminal 101 has to request to newly establish a session in order to receive a service.

For example, the user terminal 101 may transmit a session establishment message to at least one of the UPF 301, the SMF 302, or the AMF 304.

In other words, since the UPF 301 may be a stateless VNF that does not store the session information, in order to overcome the failure without deleting the session information, the session information has to be obtained from a control plane entity such as the SMF 302. For reference, 3GPP 23.007 describes that in a control/user plane separation (CUPS) structure, when a failure occurs in a gateway, existing session information is deleted from a network and session information is newly set for the purpose of session restoration. Accordingly, it may take a long time until a service is resumed because all session-related information including a UE IP needs to be newly received, and network overhead may occur because lots of signaling with many entities such as a UDM (HSS) and a PCF (PCRF) is required.

FIG. 13 is a flowchart of a failure recovery method in which session information is not deleted when a failure occurs.

In operation 1301, the UPF 301 may identify a session management module with a failure and may identify a session managed by the session management module with the failure, as described above.

In operation 1303, the UPF 301 may determine a substitute module. For example, the UPF 301 may determine a standby module in the UPF 301 as the substitute module that replaces the session management module with the failure.

In operation 1305, the UPF 301 may request the SMF 302 for session information. For example, the UPF 301 may request the SMF 302 for the session information through a N4 association setup request message. In an LTE communication method, a GW-U may request a GW-C for the session information through an Sx association setup request message.

According to some embodiments of the disclosure, the N4 association setup request message or the Sx association setup request message may include a session identifier. According to some embodiments of the disclosure, the session identifier may be a CSID or an FQ-CSID. The CSID and the FQ-CSID may be the same as those described above.

In operation 1307, the SMF 302 may search the database 504 based on the session information request received from the UPF 301. According to some embodiments of the disclosure, the SMF 302 may search for the session information based on session identifier information received from the UPF 301. For example, the SMF 302 may search the database 504 based on the FQ-CSID received from the UPF 301.

In operation 1309, the SMF 302 may provide the session information to the UPF 301. For example, the SMF 302 may provide the session information to the UPF 301 by using a create session request message. In the LTE communication method, the GW-C may provide the session information to the GW-U through a PDU session establishment request.

Accordingly, when the method of FIG. 13 is used, unlike in FIG. 12, the user terminal 101 may continuously receive a service without newly establishing a session. In other words, since the failure is overcome through signaling between the UPF 301 and the SMF 302 for the session information of the session management module with the failure, a time may be reduced and the number of times signaling is performed may also be reduced.

Figure 14:
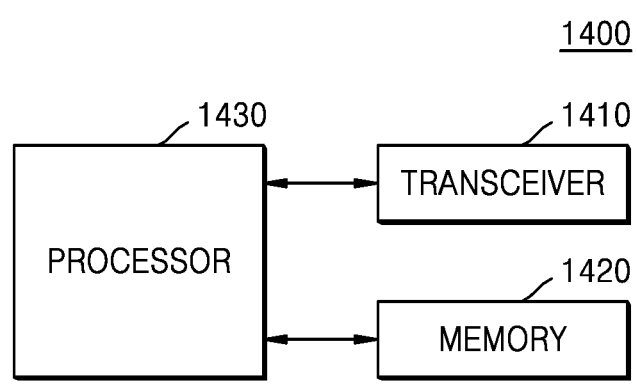
FIG. 14 is a block diagram illustrating an entity included in a wireless communication system according to an embodiment.

FIG. 14 is a block diagram of an entity 1400 included in a wireless communication system according to some embodiments of the disclosure.

Referring to FIG. 14, the above-described entities may include a transceiver 1410, a memory 1420, and a processor 1430. In other words, all entities constituting the 4G and 5G communication systems of FIGS. 2 and 3 including a user plane entity and a control plane entity may include the elements of FIG. 14. However, the disclosure is not limited thereto, and the entity 1400 may include elements more or fewer than the elements illustrated in FIG. 14.

According to some embodiments of the disclosure, the transceiver 1410, the memory 1420, and the processor 1430 of the entity 1400 may be implemented as one chip or card.

According to some embodiments of the disclosure, the transceiver 1410 may transmit/receive traffic. Also, the transceiver 1410 may communicate with, but not limited to, a user terminal, a base station, or other entities.

According to some embodiments of the disclosure, the transceiver 1410 may obtain information about at least one session managed by a session management module with a failure from a control plane entity.

Also, the transceiver 1410 may transmit a request for the information about the at least one session managed by the session management module with the failure, and may receive the information about the at least one session from the control plane entity based on the request. Also, according to some embodiments of the disclosure, the transceiver 1410 may receive the information about the at least one session managed by the session management module with the failure according to each session.

Also, the transceiver 1410 may obtain the information about the at least one session managed by the session management module with the failure through a PDU session establishment request message or a create session request message.

Also, according to some embodiments of the disclosure, the transceiver 1410 may receive the request for the information about the at least one session managed by the session management module with the failure and may transmit the information about the at least one session to a user plane entity.

Also, according to some embodiments of the disclosure, the transceiver 1410 may provide the information about the at least one session to a substitute module that replaces the session management module with the failure.

According to some embodiments of the disclosure, the memory 1420 may store instructions or a program used to control the processor 1430 and the transceiver 1410. Also, the memory 1420 may include a database.

According to some embodiments of the disclosure, the memory 1420 may include at least one type of storage medium from among a flash memory type, a hard disk type, a multimedia card micro type, a card type memory (e.g., a SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

According to some embodiments of the disclosure, the processor 1430 controls an overall operation of the entity 1400. For example, the processor 1430 may generally control elements included in the entity 1400 by executing a program stored in the entity 1400.

According to some embodiments of the disclosure, the processor 1430 may identify a session management module with a failure from among a plurality of session management modules that each manage at least one session. Also, the processor 1430 may determine a substitute module that replaces the session management module with the failure, and may control the substitute module to manage at least one session based on obtained information about the at least one session.

Also, according to some embodiments of the disclosure, the processor 1430 may search for the information about the at least one session managed by the session management module with the failure. Also, other operations of elements constituting the entity 1400 to manage a session are the same as those described above, and thus a detailed explanation thereof will not be given here.

The device described herein may include a processor, a memory for storing and executing program data, a permanent storage unit such as a disk drive, a communications port for handling communications with external devices, and user interface devices such as a touch panel, keys, and buttons. When software modules or algorithms are involved, these software modules may be stored as program instructions or computer-readable codes executable on a processor on a computer-readable recording medium. Examples of the computer-readable recording medium include magnetic storage media (e.g., ROMS, RAMS, floppy disks, or hard disks), and optical recording media (e.g., compact disc read-only memories (CD-ROMs) or digital versatile disks (DVDs)). The computer-readable recording medium may also be distributed over network coupled computer systems so that the computer-readable code is stored and executed in a distributive manner. The computer-readable recording medium may be read by a computer, stored in a memory, and executed by a processor.

All references, including publications, patent applications, and patents, cited herein are hereby incorporated by reference to the same extent as if each reference were individually and specifically indicated to be incorporated by reference and were set forth in its entirety herein.

For the purposes of promoting understanding of the principles of the disclosure, reference has been made to the embodiments of the disclosure illustrated in the drawings, and specific language has been used to describe these embodiments of the disclosure. However, no limitation of the scope of the disclosure is intended by this specific language, and the disclosure should be construed to encompass all embodiments of the disclosure that would normally occur to one of ordinary skill in the art.

The disclosure may be described in terms of functional block components and various processing steps. Such functional blocks may be realized by any number of hardware and/or software components configured to perform specified functions. For example, the disclosure may employ various integrated circuit (IC) components, e.g., memory elements, processing elements, logic elements, and look-up tables, which may carry out a variety of functions under the control of one or more microprocessors or other control devices. Similarly, where the elements of the disclosure are implemented using software programming or software elements, the disclosure may be implemented with any programming or scripting language such as C, C++, Java, or assembler language, with the various algorithms being implemented with any combination of data structures, objects, processes, routines, or other programming elements. Functional aspects may be implemented in algorithms that are executed on one or more processors. Furthermore, the disclosure could employ any number of techniques according to the related art for electronics configuration, signal processing, and/or data processing. The words "mechanism", "element", "means", and "configuration" are used broadly and are not limited to mechanical or physical embodiments of the disclosure, but may include software routines in conjunction with processors, etc.

The particular implementations shown and described herein are illustrative examples of the disclosure and are not intended to otherwise limit the scope of the disclosure in any way. For the sake of brevity, conventional electronics, control systems, software development, and other functional aspects of the systems may not be described in detail.

Furthermore, the connecting lines, or connectors shown in the various figures presented are intended to represent exemplary functional relationships and/or physical or logical couplings between the various elements. It should be noted that many alternative or additional functional relationships, physical connections, or logical connections may be present in a practical device. Moreover, no item or component is essential to the practice of the disclosure unless the element is specifically described as "essential" or "critical".

The use of the terms "a" and "an", and "the" and similar referents in the context of describing the disclosure (especially in the context of the following claims) is to be construed to cover both the singular and the plural. Furthermore, recitation of ranges of values herein is merely intended to serve as a shorthand method of referring individually to each separate value falling within the range, unless otherwise indicated herein, and each separate value is incorporated into the specification as if it were individually recited herein. Also, the steps of all methods described herein may be performed in any suitable order unless otherwise indicated herein or otherwise clearly contradicted by context. The disclosure is not limited to the described order of the steps. The use of any and all examples, or exemplary language (e.g., "such as") provided herein, is intended merely to better illuminate the disclosure and does not pose a limitation on the scope of the disclosure unless otherwise claimed. It will be understood by one of ordinary skill in the art that numerous modifications, adaptations, and changes will be made according to design conditions and factors without departing from the spirit and scope of the disclosure.

What is claimed is:

1. A method of managing a plurality of sessions in a wireless communication system, the method comprising:

identifying, by a user plane entity including a plurality of session management modules, a failed session management module from among the plurality of session management modules included in the user plane entity, each of which respectively managing a portion of the plurality of sessions;

determining, by the user plane entity, a substitute module among the plurality of session management modules to replace the failed session management module;

transmitting, by the user plane entity, to a control plane entity, a request message including at least one session identifier used by the control plane entity for requesting information about at least one session managed by the failed session management module;

receiving, by the user plane entity, from the control plane entity, the information about the at least one session managed by the failed session management module, based on the transmitted request message; and controlling, by the user plane entity, the substitute module to manage the at least one session from among the plurality of sessions managed by the failed session management module, based on the received information about the at least one session.

2. The method of claim 1, wherein the request message for requesting the information about the at least one session comprises:

at least one of address information of the substitute module, and a respective session identifier for each of the at least one session managed by the failed session management module.

3. The method of claim 1, wherein an association setup request message comprises the request message for requesting the information about the at least one session, and
wherein the association setup request message is one of N4 association setup request message which is a message in a 5 generation core network and an Sx association setup request message which is a message in an long term evolution (LTE) network.

4. The method of claim 1, wherein the receiving of the information about the at least one session comprises receiving, from the control plane entity, the information about the at least one session managed by the failed session management module, according to each of the at least one session.

5. The method of claim 1, wherein the receiving of the information about the at least one session comprises receiving the information about the at least one session managed by the failed session management module through a packet data unit (PDU) session establishment request message or a create session request message.

6. The method of claim 1, wherein the information about the at least one session comprises at least one of quality of service (QoS) information, billing information, user equipment (UE) address information, and terminal equipment (TE) address information.

7. A method of managing a plurality of sessions in a wireless communication system, the method comprising:
receiving, by a control plane entity, from a user plane entity including a plurality of session management modules, a request message including at least one session identifier for requesting information about at least one session from among the plurality of sessions, managed by a failed session management module from among the plurality of session management modules included in the user plane entity, each of which respectively managing a portion of the plurality of sessions;
searching for, by the control plane entity, the information about the at least one session managed by the failed session management module, based on the received request message; and
transmitting, by the control plane entity, to the user plane entity, the information about the at least one session managed by the failed session management module.

8. The method of claim 7, wherein the transmitting comprises providing the information about the at least one session to a substitute session module of the user plane entity that replaces the failed session management module.

9. The method of claim 7, wherein the transmitting comprises transmitting the information about the at least one session managed by the failed session management module using a packet data unit (PDU) session establishment request message according to each session.

10. An apparatus for managing a plurality of sessions in a wireless communication system, the apparatus comprising:
a transceiver; and
at least one processor coupled with the transceiver and configured to:
identify a failed session management module from among a plurality of session management modules included in a user plane entity, each of which respectively managing a portion of the plurality of sessions,
determine a substitute module among the plurality of session management modules to replace the failed session management module,
transmit to a control plane entity, a request message including at least one session identifier used by the control plane entity for requesting information about at least one session managed by the failed session management module,
receive from the control plane entity, the information about the at least one session managed by the failed session management module, based on the transmitted request message, and
control the substitute module to manage the at least one session from among the plurality of sessions managed by the failed session management module, based on the received information about the at least one session.

11. The apparatus of claim 10, wherein the request message for requesting the information about the at least one session comprises at least one of:
address information of the substitute module, and
a session identifier of each of the at least one session managed by the failed session management module.

12. The apparatus of claim 10, wherein the at least one processor is further configured to send an association setup request message comprising the request message for requesting the information about the at least one session,
wherein the association setup request message comprises at least one of an N4 association setup request message which is a message in a 5 generation core network and an Sx association setup request message which is a message in an long term evolution (LTE) network.

13. The apparatus of claim 10, wherein the at least one processor is further configured to receive, from the control plane entity, the information about the at least one session managed by the failed session management module, according to each session.

14. The apparatus of claim 10, wherein the at least one processor is further configured to receive the information about the at least one session managed by the failed session management module through a packet data unit (PDU) session establishment request message or a create session request message.

15. The apparatus of claim 10, wherein the information about the at least one session comprises at least one of quality of service (QoS) information, billing information, user equipment (UE) address information, and terminal equipment (TE) address information.

16. An apparatus for managing a plurality of sessions in a wireless communication system, the apparatus comprising:
a transceiver; and
at least one processor coupled with the transceiver and configured to:
receive, from a user plane entity including a plurality of session management modules, a request message including at least one session identifier for requesting information about at least one session among the plurality of sessions, wherein the at least one session is managed by a failed session management module among the plurality of session management modules included in the user plane entity, each of which respectively managing a portion of the plurality of sessions,
search for the information about the at least one session from among the plurality of sessions managed by the failed session management module and transmit, to the user plane entity, the information about the at least one session managed by the failed session management module.

17. The apparatus of claim 16, wherein the at least one processor is further configured to provide the information about the at least one session to a substitute module of the user plane entity that replaces the failed session module.

18. A non-transitory computer-readable recording medium having embodied thereon a program for executing the method of claim 1.

* * * * *